(12) United States Patent
Shim et al.

(10) Patent No.: US 12,149,302 B2
(45) Date of Patent: Nov. 19, 2024

(54) SURFACE WAVE GENERATOR ATTACHABLE ON SHIP METAL BODY FOR COMMUNICATION

(71) Applicants: KOREA INSTITUTE OF OCEAN SCIENCE & TECHNOLOGY, Busan (KR); Sunnywavetech, Ulsan (KR)

(72) Inventors: Woo Seong Shim, Daejeon (KR); Bu Young Kim, Daejeon (KR); Hak Sun Kim, Seoul (KR); Jin Woo Kong, Incheon (KR)

(73) Assignees: Korea Institute of Ocean Science & Technology, Busan (KR); Sunnywavetech, Ulsan (KR); UNIST (Ulsan National Institute of Science and Technology), Ulsan (KR)

( * ) Notice: Subject to any disclaimer, the term of this patent is extended or adjusted under 35 U.S.C. 154(b) by 358 days.

(21) Appl. No.: 17/824,140

(22) Filed: May 25, 2022

(65) Prior Publication Data
US 2023/0187806 A1   Jun. 15, 2023

(30) Foreign Application Priority Data
Dec. 14, 2021   (KR) .................. 10-2021-0178804

(51) Int. Cl.
*H04B 5/20*   (2024.01)
*H01P 7/00*   (2006.01)
(Continued)

(52) U.S. Cl.
CPC .................. *H04B 5/20* (2024.01); *H01P 7/00* (2013.01); *H01Q 1/34* (2013.01); *H01Q 13/26* (2013.01)

(58) Field of Classification Search
CPC .... H01P 3/10; H01P 7/00; H01Q 1/34; H01Q 13/26; H04B 3/52; H04B 5/20
See application file for complete search history.

(56) References Cited

U.S. PATENT DOCUMENTS

| 8,017,079 B2 | 9/2011 | Kang et al. |
| 9,608,683 B2 * | 3/2017 | Kawasaki ............... H01P 3/121 |

(Continued)

FOREIGN PATENT DOCUMENTS

| CN | 107634335 A | 1/2018 |
| CN | 111416207 A | 7/2020 |

(Continued)

*Primary Examiner* — Nguyen T Vo
(74) *Attorney, Agent, or Firm* — Knobbe, Martens, Olson & Bear, LLP (57) ABSTRACT

A surface wave generator is proposed. The generator may include a radiator configured to generate an electromagnetic field based on a signal externally applied. The generator may also include a first dielectric substrate on a top of the radiator and a second dielectric substrate on a bottom of the radiator. The generator may further include a first surface wave generation member on a bottom of the second dielectric substrate, a first geometric pattern being deposited on a top of the first surface wave generation member. The generator may further include a third dielectric substrate on a bottom of the first surface wave generation member. The generator may also include a second surface wave generation member between the third dielectric substrate and a metal surface, a second geometric pattern different from the first geometric pattern and being deposited on an upper surface of the second surface wave generation member.

5 Claims, 6 Drawing Sheets

(51) Int. Cl.
*H01Q 1/34* (2006.01)
*H01Q 13/26* (2006.01)

(56) References Cited

U.S. PATENT DOCUMENTS

| | | | |
|---|---|---|---|
| 2008/0303734 A1 | 12/2008 | Teshirogi et al. | |
| 2013/0064311 A1* | 3/2013 | Turner | H04B 3/52 |
| | | | 375/259 |
| 2013/0314182 A1* | 11/2013 | Takeda | H01P 3/16 |
| | | | 333/24 R |
| 2014/0178064 A1* | 6/2014 | Hino | H04B 3/52 |
| | | | 398/41 |
| 2017/0256507 A1* | 9/2017 | Choe | H01P 5/187 |
| 2017/0324168 A1* | 11/2017 | Clark | H04B 1/40 |

FOREIGN PATENT DOCUMENTS

| | | |
|---|---|---|
| CN | 112803159 A | 5/2021 |
| JP | 2001-320228 A | 11/2001 |
| KR | 10-0768038 B1 | 10/2007 |

* cited by examiner

SURFACE WAVE GENERATOR ATTACHABLE ON SHIP METAL BODY FOR COMMUNICATION

CROSS REFERENCE TO RELATED APPLICATION

The present application claims priority to Korean Patent Application No. 10-2021-0178804, filed Dec. 14, 2021, the entire contents of which are incorporated herein for all purposes by this reference.

BACKGROUND

Technical Field

The present disclosure relates to a surface wave generator attachable on a metal surface to propagate a surface wave signal.

Description of Related Technology

Communication schemes for propagating a signal are broadly categorized into a wired communication scheme and a wireless communication scheme depending on a medium in use for a signal propagation.

SUMMARY

One aspect is a surface wave generator that can minimize an influence on a state of a metal surface and thus increasing signal propagation efficiency.

In the surface wave generator, the metal surface is used as a path (medium) along which a magnetic field flows. However, the metal surface on which the surface wave generator is actually mounted is exposed to various external environments. Thus, a foreign-material layer is deposited on the metal surface. Therefore, unlike the case of an ideal medium, the foreign-material layer is deposited on the metal surface exposed to the external environment, thereby causing the problem of decreasing the communication efficiency.

The foreign-material layer decreases the efficiency of surface wave communication and may also make communication inside a metal structure impossible.

The thicker the foreign-material layer, the more decreased the efficiency of communication by the surface wave generator. Therefore, there is a demand for a surface wave generator capable of solving this problem.

Another aspect is a surface wave generator that propagates a surface wave signal along a metal surface, the generator including; a radiator to which a signal is applied from the outside and which forms an electromagnetic field; a first dielectric substrate positioned on the top of the radiator; a second dielectric substrate positioned on the bottom of the radiator; a first surface wave generation member positioned on the bottom of the second dielectric substrate, a first geometric pattern being deposited on the top of the first surface wave generation member; a third dielectric substrate positioned on the bottom of the first surface wave generation member; and a second surface wave generation member positioned between the third dielectric substrate and the metal surface, a second geometric pattern being deposited on an upper surface of the second surface wave generation member, wherein the first geometric pattern and second geometric pattern are deposited in such a manner as to be different from each other, and wherein when the signal is applied from the outside, resonance is generated through the electromagnetic field generated in the radiator.

According to the present disclosure, a structure of the surface wave generator varies according to a state of a metal surface of a metal structure. Thus, the effect of not decreasing the communication efficiency despite the presence of a foreign-material layer. The present disclosure may find application in various metal structures.

A structure of a surface wave generator according to an embodiment of the present may be determined according to the presence of a foreign material on a surface of a ship or apparatus on which the surface wave generator is to be mounted. For example, even in a case where a paint or the like is necessarily required to protect the metal surface, the structure of the surface wave generator is determined considering the thickness or inherent permittivity of the paint. Thus, the effect of increasing the communication efficiency can be achieved.

BRIEF DESCRIPTION OF THE DRAWINGS

The above and other objectives, features, and other advantages of the present disclosure will be more clearly understood from the following detailed description when taken in conjunction with the accompanying drawings.

DETAILED DESCRIPTION

The wired communication scheme has the advantage of having high propagation efficiency and causing little data loss. However, the wired communication scheme needs a cable having a length that is proportional to a proportional a distance over which to transmit a signal. The cable may also be additionally needed depending on the number of terminals. In addition, in a case where the cable is installed underground or underwater for connection, the cable is difficult to install and maintain in the wired communication scheme.

By contrast, the wireless communication scheme has the disadvantage of having low transmission efficiency and causing great data loss over the wired communication system. However, the wireless communication scheme has the advantage of easy installation and maintenance regardless of an increase in the distance over which to transmit a signal and in the number of terminals.

However, the wireless communication scheme, in a case where an obstacle is present on a transmission path or where a medium other than air is employed, signal distortion phenomena, such as reflection, refraction, and absorption, occur. Thus, signal loss is greatly increased. In an internal space (for example, the inside of a ship, the inside of a container, or the like) surrounded by a conductor, signal transmission through wireless communication is limited. In order to overcome this environment where a wave does not reach the internal space, a communication system that uses a metal surface is required.

In describing an embodiment of the present disclosure, a specific description of a well-known technology related to the present disclosure, when determined to unnecessarily make the nature and gist of the present disclosure obfuscated, is omitted. Terms defined by considering the meanings thereof in the present disclosure will be used, but may vary according to the intention of a user or a manager, the common practices in the art, and the like. Therefore, the terms should be construed in light of the present specification. Throughout the present specification, the terms are used only to describe the embodiment of the present disclosure and should not be construed in a limited manner. Unless specified otherwise throughout the present specification, a singular noun or a singular noun phrase may have a plural meaning. Throughout the present specification, the terms "include" and "have" should be construed to mean that named features, numbers, steps, operations, constituent elements, and some thereof or a combination thereof are essential, but that one or more other named features, numbers, steps, operations, constituent elements, and some thereof or a combination thereof may be additionally included.

In some cases, constituent elements of each system illustrated in the drawing may be assigned the same reference number or different reference numbers to indicate that the constituent elements are the same as each other or different from each other, respectively. However, constituent elements have different configurations in order to operate in several or all of the systems that are described with reference to the drawings in the present specification. Various constituent elements illustrated in the drawings may be the same as each other or may be different from each other. Any one of the various constituent elements may be arbitrarily termed a first constituent element or a second constituent element.

In the present specification, the expression "a constituent element is connected to another constituent element" should be construed to mean not only that a constituent element is directly connected to another constituent element, but also that a constituent element is connected to another constituent element with a third constituent element being interposed therebetween.

In the present specification, that one constituent element "transmits" or "provides" data or a signal to another constituent element means not only that one constituent element directly "transmits" or "provides" data or a signal to another constituent element, but also that one constituent element "transmits" or "provides" data or a signal to another constituent element through at least a third constituent element.

A specific embodiment of the present disclosure will be described below with reference to the drawings. In the present specification, a detailed description of a method, an apparatus and/or a system is provided below to assist a person of ordinary skill in the art in getting a comprehensive understanding of the present disclosure. However, the detailed description thereof is exemplary, and the present disclosure is not limited thereto.

Figure 1:
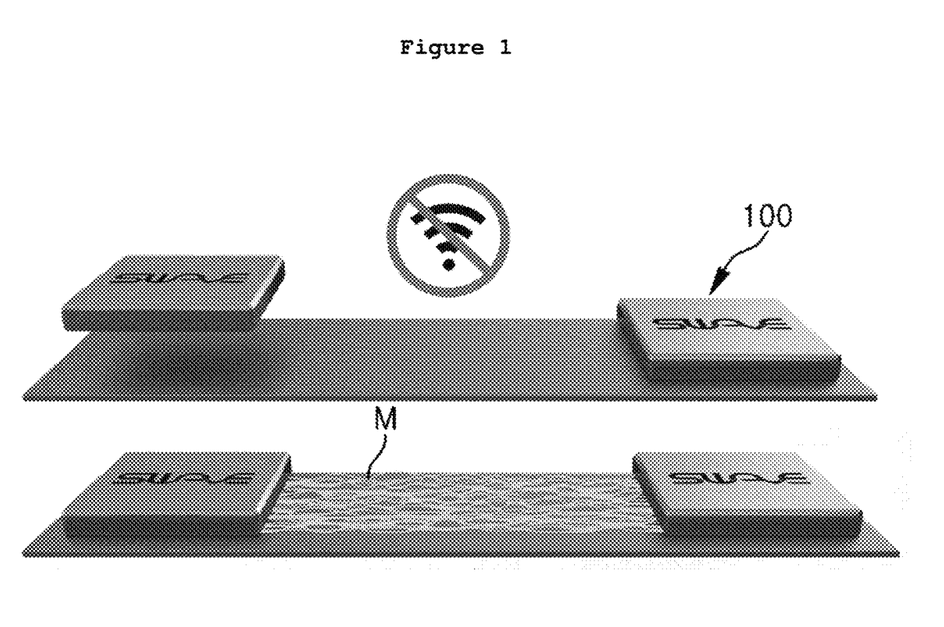
FIG. 1 is a conceptual diagram illustrating communication for which a surface wave generator according to a first embodiment of the present disclosure is used.

FIG. 1 is a conceptual diagram illustrating communication for which a surface wave generator according to a first embodiment of the present disclosure is used.

With reference to FIG. 1, a surface wave generator 100 according to the first embodiment of the present disclosure may perform surface wave communication, with a metal surface as a medium.

The surface wave communication is a technology that generates a surface wave at a surface of a metal body and performs communication along the surface wave. The surface wave communication is possible in any space in which a metal structure is present. The surface wave communication may include evanescent communication, inhomogeneous-wave communication, and the like.

The surface wave generator 100 according to the first embodiment of the present disclosure is attached to the metal surface and thus generates the surface wave. Accordingly, a signal may be propagated along the metal surface to which the surface wave generator 100 is attached.

The metal surface here may be a surface of a structure formed of metal. Examples of the metal structure to which the surface wave generator 100 according to the first embodiment of the present disclosure include a ship, a container structure, a vacuum chamber, a metal pipe structure, such as an oil pipeline, and the like, but are not limited thereto. In addition, the surface wave generator 100 may find application in various structures having a metal surface.

Some metal structures have a curved metal surface. Thus, an electromagnetic wave shielding environment where an electromagnetic wave has difficulty reaching all portions or one portion of the inside of the metal structure can be created. In this environment, signal transmission through wireless communication is inevitably limited. In such a case, the surface wave communication for which the surface wave generator 100 according to the first embodiment of the present disclosure is utilized may be an alternative to the wireless communication.

An electric field in an electromagnetic wave may decrease rapidly in intensity as an electric field progresses along a plane of the metal surface, but a magnetic field M may not decrease in intensity although the magnetic field M processes along the plane of the metal surface. Therefore, the surface wave generator 100 may perform communication along the metal surface using the magnetic field M.

As an implementation example, the above-described magnetic field M may vary in form according to a magnetic pattern stacked on a surface wave generation member that constitutes the surface wave generator 100. The magnetic pattern stacked on the surface wave generation member is described in detail with reference to FIGS. 2 and 3.

An Industrial Scientific Medical (ISM) band is a communication frequency band. Low-output wireless devices that do need to receive permission to engage in communication perform communication over the ISM band.

As an implementation example, the surface wave generator 100 may receive a wave of a frequency in the ISM band and may generate an electromagnetic field. For example, the surface wave generator 100 may be mounted on a surface of the metal structure and thus may support communication at a frequency in the ISM band in the field of industry, science, and medical apparatuses and in everyday life.

The surface wave generator 100 according to the first embodiment of the present disclosure is described as using the ISM band in the implementation example, but in an exemplary manner. For the use of the frequency band, the present disclosure is not limited to the ISM band. Communication that uses various frequency bands is possible by changing the number of layers, an area, a thickness, a pattern, and the like.

In order to perform communication for serving a purpose other than receiving a wave of the frequency in the ISM band to perform communication, a structure of the surface wave generator 100 according to the first embodiment of the present disclosure may be changed in such a manner as to receive a wave of a necessary frequency. The change of the structure of the surface wave generator is described in detail with reference to FIGS. 2 and 3.

The above-described surface wave generator 100 according to the first embodiment of the present disclosure is mounted on a ship or apparatus in such a manner that, before manufacturing thereof, the structure thereof is changed considering information on a metal surface of the ship or on metal surfaces of the various facilities. Thus, the effects of being able to overcome a reduction in communication efficiency due to a foreign-material layer and to perform efficient surface wave communication can be achieved.

Figure 2:
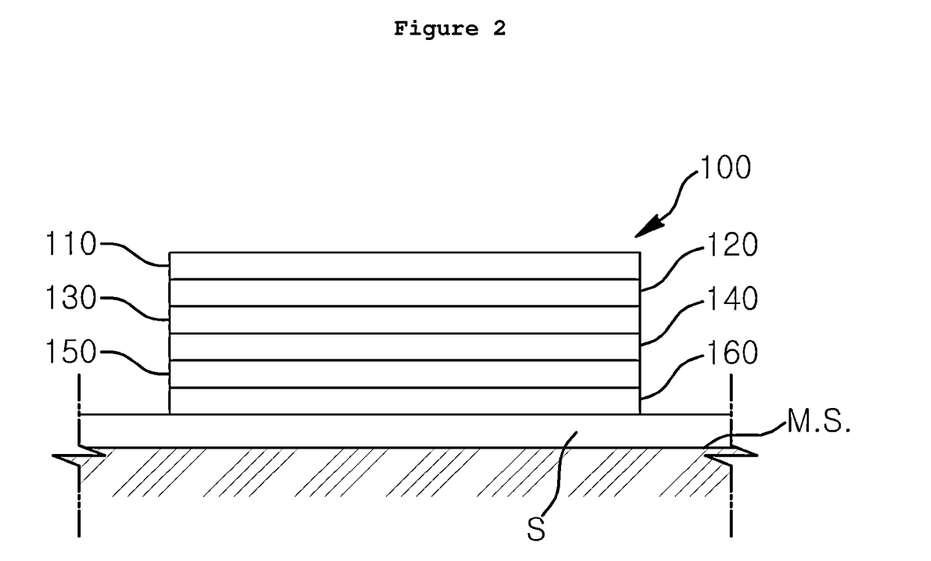
FIG. 2 is a cross-sectional view illustrating the surface wave generator according to the first embodiment of the present disclosure.

FIG. 2 is a cross-sectional view illustrating the surface wave generator according to the first embodiment of the present disclosure;

With reference to FIG. 2, the surface wave generator 100 according to the first embodiment of the present disclosure includes a radiator 120, a first dielectric substrate 110, a second dielectric substrate 130, a first surface wave generation member 140, a third dielectric substrate 150, and a second surface wave generation member 160. The radiator 120 receives a signal and forms an electromagnetic field. The first dielectric substrate 110 is positioned on the top of the radiator 120. The second dielectric substrate 130 is positioned on the bottom of the radiator 120. The first surface wave generation member 140 is positioned on the bottom of the second dielectric substrate 130. The third dielectric substrate 150 is positioned on the bottom of the first surface wave generation member 140. The second surface wave generation member 160 is positioned on the bottom of the third dielectric substrate 150.

The first dielectric substrate 110 is a commonly used rectangular substrate. The first dielectric substrate 100 may be formed of a material, such as epoxy resin or resin. A reception circuit, a transmission circuit, or the like may be formed on the first dielectric substrate 110 and may be electrically connected to the radiator 120 described below.

The surface wave generator 100 according to the first embodiment of the present disclosure may form the electromagnetic field according to the signal applied from the outside. When the electromagnetic field is formed, the surface wave generator 100 may emit a radio wave using capacitive properties that occur between each of the first dielectric substrate 110, the radiator 120, the second dielectric substrate 130, and the third dielectric substrate 150 and inductive properties that occur in the first surface wave generation member 140 and the second surface wave generation member 160.

As an implementation example, the electromagnetic field generated through the radiator 120 may pass through the second dielectric substrate 130 and may cause a radio wave to be propagated toward the first surface wave generation member 140. The electromagnetic field passing through the first surface wave generation member 140 may pass through the third dielectric substrate 150 and may cause a radio wave to be propagated toward the second surface wave generation member 160.

As an implementation example, the first surface wave generation member 140 and the second surface wave generation member 160 may collect magnetic energy that is capable of passing through a metal using geometric patterns, respectively, deposited on surfaces thereof and then may generate the magnetic field M in the horizontal direction. The electromagnetic wave is a wave that is created due to a periodic change of the electric filed or the magnetic field M, both the fields being generated at the same time in the vicinity when electric current flows. As the electromagnetic wave progresses along the metal surface, the electric field rapidly decreases in intensity. However, the magnetic field M has the property of not decreasing in intensity. Therefore, the surface wave generator 100 may perform communication along the metal surface using the magnetic field M.

As an implementation example, geometric patterns may be deposited on the first surface wave generation member 140 and the second surface wave generation member 160, respectively. In this case, the respective geometric patterns deposited on the first surface wave generation member 140 and the second surface wave generation member 160 may be different from each other.

In this case, a foreign-material layer S is a layer formed of various materials that are present on the metal surface (MS) used as a medium in the surface wave communication and that are capable of changing electromagnetic properties. Examples of such materials may include paint applied to a metal surface of the metal structure, dust sitting on the metal surface, a corrosion product caused by corrosion of metal, salt, and a contaminant. The foreign-material layer S is not limited to these materials.

The surface wave generator 100 according to the first embodiment of the present disclosure may be mounted on a ship, and the metal structure may be part of the ship or be the ship itself. Paint or the like may be applied to the ship in order to prevent corrosion thereof. The paint applied to a surface of the ship that is the metal structure, or to a portion of the surface thereof, is a specific one example of the foreign-material layer S. In this case, the foreign-material layer S may be one layer that is formed of various materials that are mixed or may have a multiple-layered structure. The presence of this foreign-material layer S can decrease the efficiency of the transmission by the surface wave generator 100 along a metal surface.

Table 1 shows the results of experiments with the efficiency of the surface wave generator 100 that varies with an increase in the thickness of the foreign-material layer S.

TABLE 1

| THICKNESS | GHz | | | |
|---|---|---|---|---|
| | 2.4 | 2.45 | 2.5 | Avg. |
| 0 mm | 59% | 60% | 58% | 59% |
| 1 mm | 62% | 64% | 15% | 47% |
| 2 mm | 52% | 32% | 33% | 39% |
| 3 mm | 36% | 15% | 23% | 25% |

From Table 1, it can be seen that as the thickness of the foreign-material layer S increases, the communication efficiency decreases. This decrease may result from a change in impedance due to the foreign-material layer S. From the experimental results in Table 1, it can be seen that, as the thickness of the foreign-material layer S increases to 1 mm to 3 mm, the communication efficiency in a band of 2.4 GHz to 2.5 GHz decreases from 59% to 25%.

A change in impedance due to the foreign-material layer S itself (an increase in the number of resistance components due to the foreign-material layer S or a change in a reactance (capacitance+inductance) component can be offset by providing a corresponding reactance component through magnetic field patterns deposited on the tops of a plurality of surface wave generation members of the surface wave generator 100 (for example, by performing a setting in such a manner as to achieve impedance matching). For example, in order to offset a mismatch due to a capacitance component that occurs due to the foreign-material layer S, magnetic field patterns may be deposited on the tops of the plurality of surface wave generation members, respectively, in such a manner as to be different from each other.

In an example illustrated in FIG. 2, the thicknesses and areas of each of the dielectric substrates 130 and 150, the radiator 120, and each of the surface wave generation members 140 and 160 are arbitrarily determined. Each of the dielectric substrates 130 and 150, the radiator 120, or each of the surface wave generation members 140 and 160 may be formed in such a manner that the thickness or area thereof varies according to dielectric permittivity that has an influence on properties of an antenna.

As an implementation example, the magnetic field patterns may be deposited, differently from each other, on the surface wave generation members 140 and 160, respectively, and thus the impedance matching may be achieved.

As another implementation example, the impedance matching may be achieved by determining the plurality of dielectric substrates in such a manner as to have different thicknesses or different areas and by determining the plurality of surface wave generation members in such a manner as to have different thicknesses or different areas.

For example, regarding the plurality of dielectric substrates and the plurality of surface wave generation members that constitute the surface wave generator 100, the thicknesses or areas of the plurality of dielectric substrates or the thicknesses or areas of the plurality of surface wave generation members may be determined (the areas and/or widths thereof may be adjusted) considering the thickness of the paint (the thickness of the foreign-material layer S) on the metal structure on which the surface wave generator 100 is to be mounted. Therefore, for the surface wave generator 100, the impedance matching in accordance with results of the determination of the thicknesses or areas of the dielectric substrates 130 and 150 or the surface wave generation members 140 and 160 may be achieved.

As still another implementation example, for the surface wave generator 100, the number of the dielectric substrates or the surface wave generation members that constitute the surface wave generator 100 may be determined considering a material, that is, the foreign-material layer S, other than a metal material of an apparatus on which the surface wave generator 100 is mounted.

In other words, the number of the dielectric substrates or the surface wave generation members may also be determined to solve the problem of impedance mismatch due to the foreign-material layer S present on the metal.

Figure 5:
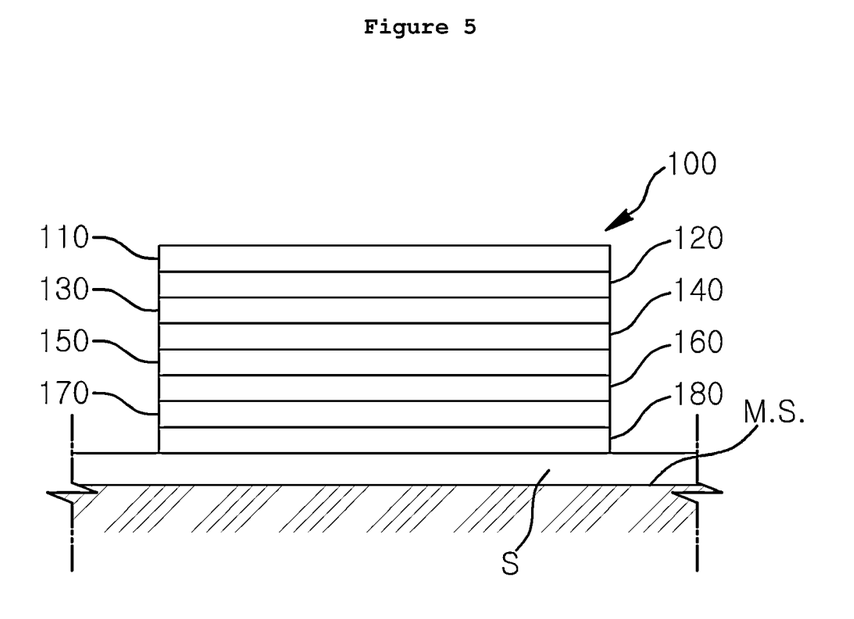
FIG. 5 is a cross-sectional view illustrating a surface wave generator according to the second embodiment of the present disclosure.

For the impedance matching, the surface wave generator 100 according to a second embodiment of the present disclosure may further include a fourth dielectric substrate positioned on the bottom of the second surface wave generation member 160 and a third surface wave generation member positioned on the bottom of the fourth dielectric substrate. In addition, depending on the situation, the surface wave generator 100 may further include a plurality of dielectric substrates and a plurality of surface wave generation members.

As another implementation example, the number of the dielectric substrates or the surface wave generation members that constitute the surface wave generator 100 may be determined to determine a frequency band of a wave that is received from the outside. In other words, the surface wave generator 100 may be manufactured in such a manner that the number of the dielectric substrates or the surface wave generation members varies according to the purpose of performing communication for which the surface wave generator 100 is used.

As still another implementation example, the thicknesses or areas of the plurality of dielectric substrates or the plurality of surface wave generation members that constitute the surface wave generator 100 may be adjusted to determine the frequency band of the wave that is received from the outside. In other words, in a case where communication is performed using the surface wave generator 100, the surface wave generator 100 may be manufactured after adaptively determining a state of a medium and the thickness, the area, and the width of each of the plurality of dielectric substrate or each of the plurality of surface wave generation members according to a frequency band in use.

As in the various implementation examples mentioned above, the structure of the surface wave generator 100 may be determined considering a type or thickness of a foreign material that is present on a medium on the metal structure on which the surface wave generator 100 is to be mounted. Thus, the efficiency of signal propagation can be increased through the impedance matching.

Figure 3:
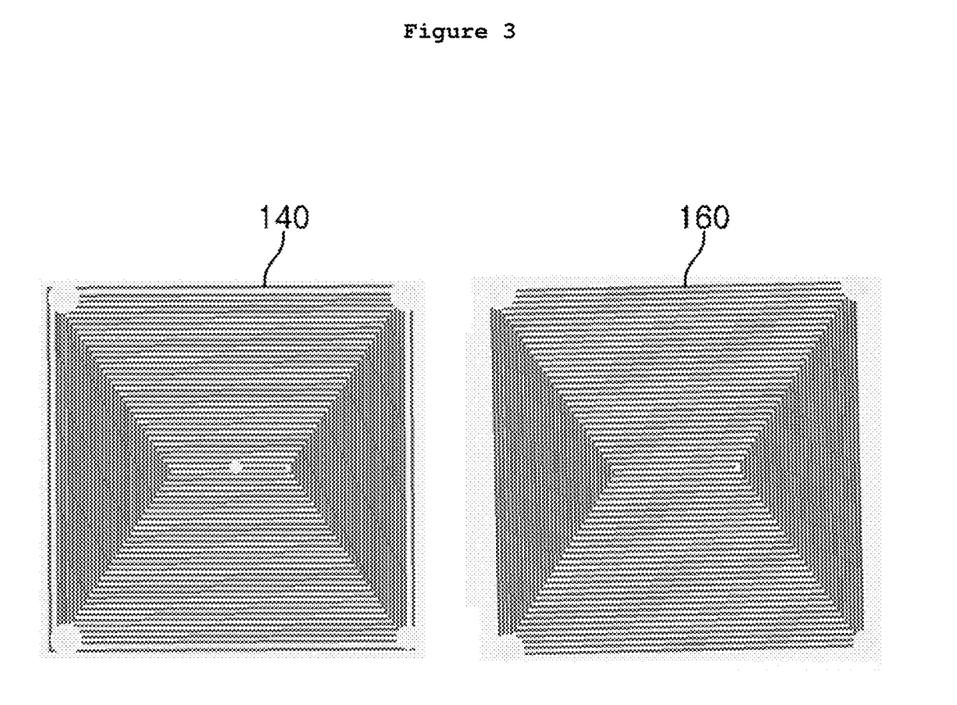
FIG. 3 is a view illustrating surface wave generation members on which different patterns according to the first embodiment of the present disclosure, respectively, are deposited.

FIG. 3 is a view illustrating the surface wave generation members 140 and 160 on which different patterns according to the first embodiment of the present disclosure, respectively, are deposited With reference to FIG. 3, magnetic bodies may be deposited on the first surface wave generation member 140 and the second surface wave generation member 160, respectively, in such a manner as to have different patterns.

As an implementation example, a physical vapor deposition (PVD), a chemical vapor deposition (CVD), or an atomic layer deposition (ALD) process may be performed for deposition. The PVD deposition processes may include a thermal evaporation process, an E-beam evaporation process, and a sputtering process.

For the CVD process, a chemical vapor deposition method may be employed, and thermal energy or plasma energy may be used. The CVD processes that use the thermal energy may include an atmosphere pressure chemical vapor deposition (APCVD) process and a low pressure chemical vapor deposition (LPCVD) process. The CVD processes that use the plasma energy may include a plasma enhanced chemical vapor deposition (PECVD) process and a high density plasma chemical vapor deposition (HDPCVD) process. For the ALD process, a method of deposition by replacement of a precursor adsorbed on a substrate may be employed. Selective deposition is possible with the ALD process.

As an implementation example, a pattern deposited on the surface wave generation member may include a magnetic body or the like, as a metal conductor. When energy is collected and then resonance occurs in a corresponding frequency band, the pattern may generate a surface wave.

A pattern illustrated in FIG. 3 is exemplary. Different pattern to be deposited on the surface wave generation members, respectively, may be determined, considering a type or thickness of a foreign material present on the metal surface of the metal structure on which the surface wave generator 100 is to be mounted.

In other words, the patterns on the surface wave generation members may be formed in various shapes according to a state of the metal surface on which the surface wave generation member is to be mounted.

The basic principle of determining the pattern on the surface wave generation member is that, when a signal is applied to the surface wave generator 100, electric field and magnetic field signals can be distinguished in the radiator 120 and magnetic energy can be collected, in the surface wave generation, through a pattern on an arbitrary surface wave generation member from the electric field and magnetic field signals.

As an implementation example, an arbitrary pattern is deposited on the above-described surface wave generation member, and thus impedance matching with a pattern on one surface of an arbitrary surface wave generation member can be performed with capacitance and inductance components of the arbitrary pattern. In addition, a frequency band to be used for communication may be adjusted.

Figure 4:
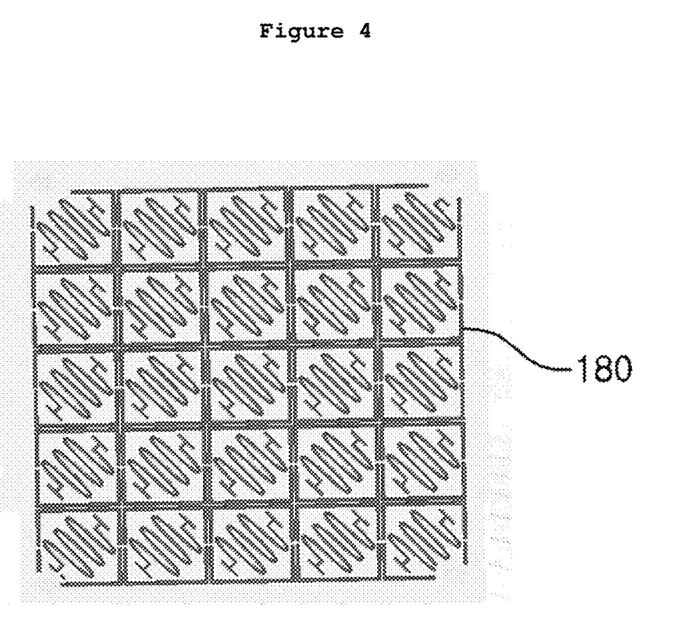
FIG. 4 is a view illustrating a third surface wave generation member according to a second embodiment.

FIG. 4 is a view illustrating a third surface wave generation member according to a second embodiment.

The surface wave generator according to the second embodiment may further include a third surface wave generation member 180. A pattern to be deposited on the third surface wave generation member 180 may be determined in a finer manner for the impedance matching.

For example, various patterns are applicable to the surface wave generation member. A rectangular meander pattern may be deposited thereon.

As an implementation example, in a case where a first pattern, a second pattern, and a third patter are deposited in this order on one surface of the surface wave generation member, more energy of the magnetic field M in accordance with the patterns may be collected. For this reason, depending on the situation, the surface wave generation member 100 may include more patterns on one surface of each of the more surface wave generation members.

As an implementation example, for deposition, a mask is arranged on the top of the surface wave generation member. Then, by performing a deposition process for pattern formation, a magnetic material may be deposited on a region other than a region of the top thereof that is occupied by the mask.

FIG. 5 is a cross-sectional view illustrating a surface wave generation member according to the second embodiment of the present disclosure.

With reference to FIG. 5, in addition to the constituent elements of the surface wave generator 100 according to the first embodiment in FIG. 1, the surface wave generator 100 according to the second embodiment of the present disclosure may further include the fourth dielectric substrate 170 and the third surface wave generation member 180.

The surface wave generator 100 according to the second embodiment of the present disclosure may further include a plurality of dielectric substrates and a plurality of surface wave generation members, depending on a thickness and type of the foreign-material layer S present on the metal surface (MS) of the ship on which the surface wave generator 100 is to be mounted.

As an implementation example, the number of layers of the surface wave generator 100 may be determined considering a frequency band in which communication is to be performed.

For example, the number of layers may be changed depending on the frequency band in which the surface wave generator 100 is to propagate a wave.

As another implementation example, the number of layers may be changed for the impedance matching with the surface wave that occurs in the surface wave generator 100.

Figure 6:
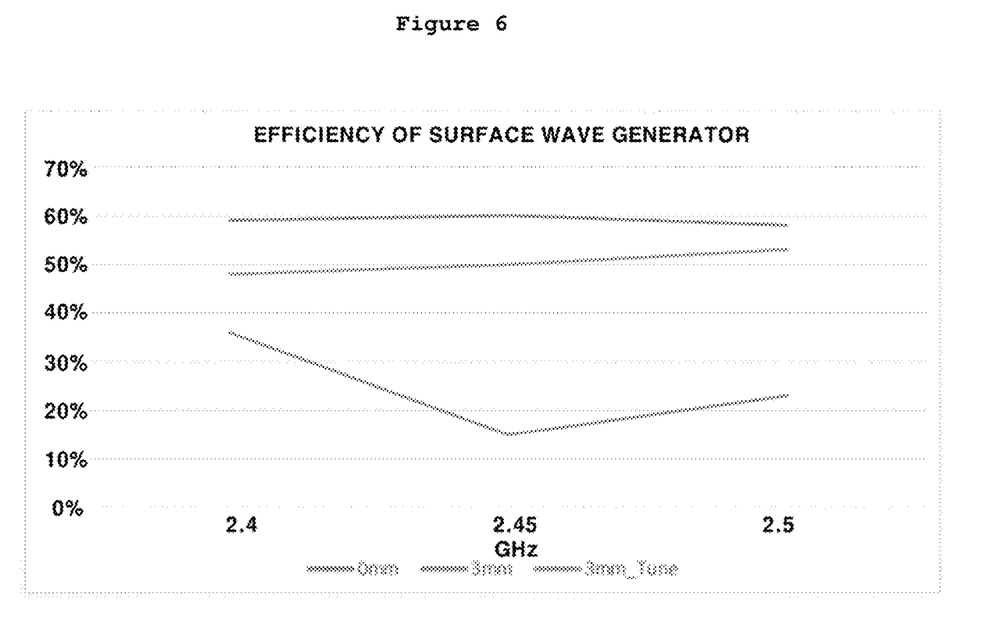
FIG. 6 is a graph showing results of performance improvement due to a change in a structure of the surface wave generator in a case where a foreign-material layer is present according to the first implementation example.

FIG. 6 is a graph showing results of performance improvement due to a change in the structure of the surface wave generator 100 in a case where a foreign-material layer S is present according to the first embodiment of the present disclosure.

From FIG. 6, the following communication efficiency of the surface wave generator 100 in the ISM band of 2.4 GHz to 2.5 GHz can be seen: the communication efficiency of the surface wave generator 100 of which the structure is not changed in a case where the foreign-material layer is not present; the communication efficiency of the surface wave generator 100 of which the structure is not changed in a case where the foreign-material layer S has a thickness of 3 mm; and the communication efficiency of the surface wave generator 100 of which the structure is changed in the case where the foreign-material layer S has a thickness of 3 mm.

TABLE 2

| THICKNESS | GHz | | | |
|---|---|---|---|---|
| | 2.4 | 2.45 | 2.5 | Avg. |
| 0 mm | 59% | 60% | 58% | 59% |
| 3 mm | 36% | 15% | 23% | 25% |
| 3 mm Tune | 51% | 50% | 53% | 51% |

From Table 2, it can be seen that in a case where the foreign-material layer S has a thickness of 3 mm, when the structure of the surface wave generator 100 is not changed, the efficiency of the surface wave generator 100 decreases to 15% at a reception frequency of 2.45 GHz, but that when the structure of the surface wave generator 100 is changed, the 50% communication efficiency of the surface wave generator 100 is achieved. Consequently, when the structure of the surface wave generator 100 is changed, it can be ensured that the effect of being able to perform smooth communication is achieved.

In addition, in an experimental frequency band, in a case where the foreign-material layer has a thickness of 3 mm, the communication efficiency that results when the structure of the surface wave generator 100 is changed (3 mm tune) is close to the communication efficiency in a case where the foreign-material layer S is not present. Consequently, it can be ensured that smooth communication is possible.

The surface wave generators having different structures may be manufactured in such a manner as to operate in various frequency bands according to a communication purpose, as well as to operate in the above-described experimental frequency band. With reference to the above-mentioned experimental example, the surface wave generator 100 may be manufactured in such a manner as to have a structure that varies to achieve the impedance matching at various frequency bands. Thus, a reduction in the communication efficiency due to the foreign-material layer S can be minimized.

A surface wave generator according to the first embodiment of the present disclosure is a surface wave generator that propagates a surface wave signal along a metal surface. The surface wave generator includes: a radiator to which a signal is applied from the outside and which forms an electromagnetic field; a first dielectric substrate positioned on the top of the radiator; a second dielectric substrate positioned on the bottom of the radiator; a first surface wave generation member positioned on the bottom of the second dielectric substrate, a first geometric pattern being deposited on the top of the first surface wave generation member; a third dielectric substrate positioned on the bottom of the first surface wave generation member; and a second surface wave generation member positioned between the third dielectric substrate and the metal surface, a second geometric pattern being deposited on an upper surface of the second surface wave generation member, wherein the first geometric pattern and second geometric pattern are deposited in such a manner as to be different from each other, and wherein when the signal is applied from the outside, resonance is generated through the electromagnetic field generated in the radiator.

The first geometric pattern and the second geometric pattern of the surface wave generator according to the first embodiment may be determined on the basis of a change in impedance due to a foreign-material layer present on the metal surface.

The surface wave generator according to the second embodiment of the present disclosure may be configured to further include a fourth dielectric substrate positioned on the bottom of the second surface wave generation member, and a third surface wave generation member positioned on the bottom of the fourth dielectric substrate.

In the surface wave generator according to the first embodiment of the present disclosure, a thickness or area of each of the first dielectric substrate, the second dielectric substrate, the third dielectric substrate, and the first surface wave generation member or the second surface wave generation member may be determined in such a manner that a frequency of a wave that is received in the first dielectric substrate is determined.

In the surface wave generator according to the first embodiment of the present disclosure, the thickness or area of each of the first dielectric substrate, the second dielectric substrate, the third dielectric substrate, and the first surface wave generation member or the second surface wave generation member may be determined on the basis of a change in impedance due to a foreign-material layer present on the metal surface.

The embodiments of the present disclosure are described above in an exemplary manner. It would be understood by a person of ordinary skill in the art to which the present disclosure pertains that the embodiments of the present disclosure are readily modified into specific forms without changing the technical idea of the present disclosure and essential features thereof. Therefore, in every aspect, the embodiments described above should be understood as being exemplary and non-restrictive.

The scope of the present disclosure is defined by the following claim rather than by the detailed description provided above. All modifications and alterations that are derived from the meaning and scope of the claim and from any equivalent to the claim should be interpreted as falling within the scope of the present disclosure.

What is claimed is:

1. A surface wave generator for propagating a surface signal along a metal surface, the generator comprising:
    a radiator configured to generate an electromagnetic field based on a signal externally applied;
    a first dielectric substrate positioned on a top of the radiator;
    a second dielectric substrate positioned on a bottom of the radiator;
    a first surface wave generation member positioned on a bottom of the second dielectric substrate, a first geometric pattern being deposited on a top of the first surface wave generation member;
    a third dielectric substrate positioned on a bottom of the first surface wave generation member; and
    a second surface wave generation member positioned between the third dielectric substrate and the metal surface, a second geometric pattern being deposited on an upper surface of the second surface wave generation member,
    wherein the first geometric pattern and the second geometric pattern are different from each other, and
    wherein resonance is configured to be generated through the electromagnetic field generated in the radiator.

2. The surface wave generator of claim 1, wherein the first geometric pattern or the second geometric pattern is configured to be determined on the basis of a change in impedance due to a foreign-material layer present on the metal surface.

3. The surface wave generator of claim 1, further comprising:
    a fourth dielectric substrate positioned on a bottom of the second surface wave generation member; and
    a third surface wave generation member positioned on a bottom of the fourth dielectric substrate.

4. The surface wave generator of claim 1, wherein a thickness or area of each of the first dielectric substrate, the second dielectric substrate, the third dielectric substrate, and the first surface wave generation member or the second surface wave generation member is configured to be determined in such a manner that a frequency of a wave that is received in the first dielectric substrate is determined.

5. The surface wave generator of claim 1, wherein a thickness or area of each of the first dielectric substrate, the second dielectric substrate, the third dielectric substrate, and the first surface wave generation member or the second surface wave generation member is configured to be determined on the basis of a change in impedance due to a foreign-material layer present on the metal surface.

* * * * *